United States Patent [19]
Lobachev et al.

[11] Patent Number: 5,411,108
[45] Date of Patent: May 2, 1995

[54] WALKING TRANSPORT VEHICLE

[76] Inventors: Vladilen I. Lobachev; Ivan V. Lobachev, both of Degtyarny per., d.26, kv. 45, 193015, Leningrad, U.S.S.R.

[21] Appl. No.: 253,838

[22] Filed: Jun. 3, 1994

Related U.S. Application Data

[63] Continuation of Ser. No. 934,441, Sep. 3, 1992, abandoned.

[30] Foreign Application Priority Data

Mar. 13, 1990 [SU] U.S.S.R. .............................. 4801273

[51] Int. Cl.$^6$ .............................................. B62D 51/06
[52] U.S. Cl. ...................................... 180/8.7; 280/5.22
[58] Field of Search ........................ 180/8.1, 8.6, 8.7; 280/5.22, 5.28, 28.5; 305/1, 3, 4, 5

[56] References Cited

U.S. PATENT DOCUMENTS

| | | | |
|---|---|---|---|
| 1,285,317 | 11/1918 | Mouras | 180/8.7 |
| 1,603,934 | 10/1926 | Bennett | 180/8.7 |
| 2,942,676 | 6/1960 | Kraus | 180/8.5 |
| 3,135,345 | 6/1964 | Scruggs | 180/8.6 |
| 3,522,859 | 9/1970 | Thring | 180/8.7 |

FOREIGN PATENT DOCUMENTS

| | | | |
|---|---|---|---|
| 326279 | 9/1920 | Germany | 180/8.6 |
| 757335 | 9/1956 | United Kingdom | 180/8.7 |
| 310012 | 9/1971 | U.S.S.R. | |

Primary Examiner—Margaret A. Focarino
Assistant Examiner—Kevin Hurley
Attorney, Agent, or Firm—Wallenstein, Wagner & Hattis, Ltd.

[57] ABSTRACT

A walking transport vehicle that is comprised of a platform with two closed guides mounted on its bottom surface, said guides having rectilinear sections and curved sections with a common center of curvature. Movably mounted in the guides are the upper ends of extensible and retractable legs. The transport vehicle also comprises of a leg drive mechanism to displace legs along the guide incorporating a continuous band conveyor with conveyor branches passing respectively along the sections of the guide, and a similar leg drive unit to displace legs along the guide.

1 Claim, 6 Drawing Sheets

WALKING TRANSPORT VEHICLE

This is a continuation of application Ser. No. 07/934,441 filed on Sep. 3, 1992, now abandoned.

TECHNICAL FIELD

The present invention relates to a walking type of self-propelled transport vehicle that interacts with the travel surface over which the transport vehicle is traversing through the medium of supports (legs) of variable length.

BACKGROUND PRIOR ART

Translation of a walking transport vehicle can be achieved by way of displacing its platform relative to the legs that this platform uses to rest upon the travel surface, e.g. upon the ground surface. There is known, for example, a walking transport vehicle (U.S. Pat. No. 3,135,345) comprising a platform, two parallel rows of rectilinear guides mounted on the bottom side of the platform, extensible and retractable legs having their upper ends mounted within said guides, and means to shift the legs along the respective guides in a fore and aft direction. At each point in the forward travel of the transport vehicle, some of the legs are in the extended (working) position, resting upon the surface being travelled and stationary relative to this surface while moving aft along the respective guides relative to the platform (which moves forward by the same dint). At the same time the other legs are in the retracted (idle) position, out of contact with the travel surface and moving forward along the respective guides relative to the platform and also together with the platform at the same time. As a result, each of the legs performs a reciprocating movement relative to the platform in the process of translation or movement.

During the time interval which it takes the platform to move one step relative to the supporting legs in the working position, each of the "idle" legs must go up to move forward and then come down to be reliably positioned for operation upon the travel surface. The time required for this operation is relatively high. This is due to the process of extending the leg and positioning it for operation being rather slow, so that possible breakdown may be avoided. The result is a retarded translation of the transport vehicle, i.e., in its lower traveling speed.

As the platform is being translated, the idle legs move along with the platform. This being so, the platform must be immobilized when a leg comes down to contact the travel surface. Otherwise, the lower end of the leg would slide along the travel surface when the leg comes in contact with it. This is undesirable because it may lead to leg breakdown if, for instance, something on the travel surface happens to hinder the movement of the lower leg end along this surface. This leads to the necessity of arresting the movement of the transport after each step, thus decreasing the travelling speed still further. In this case, there is the inertia of the platform and the equipment mounted thereupon to be dealt with at the beginning and at the termination of each step. This results in lower walking vehicle efficiency, and more particularly, when heavily loaded massive platforms are used.

When using a transport vehicle of the type described above, a very serious problem is encountered in having the platform rotated for changing its travel direction. In the design as stated above this problem is handled by way of rotating the guides in which the upper ends of the legs are mounted. This arrangement, however, results in sliding of the lower ends of the leg over the travel surface during the platform rotation process. This may lead, as previously stated, to leg breakdown, especially when a heavily loaded platform is used. This impairs the reliability of movement of the transport vehicle when a turn has to be made.

Attempts at reducing leg sliding while turning lead to highly complicated transport vehicle constructions (Soviet Union Patent No. 821282; Soviet Union Patent No. 856890). Thus, Soviet Union Patent No. 856890 describes a design wherein flexible guides are used for preventing the legs from sliding while making a turn. These guides may be bent following segments of circles having a common center of curvature. However, this flexible guide design is of little use in practical applications, considering its complexity, poor reliability and low carrying capacity.

Speed increases in continuous translation of the platform of a walking transport vehicle can be achieved by displacing the legs relative to the platform with the aid of a band-type conveying device or conveyor means. There is known a transport vehicle of this type, namely, U.S. Pat. No. 3,522,859. This device is provided with two groups of extensible and retractable legs and two drive mechanisms mounted on the platform sides to provide for their movement. Each drive mechanism comprises a continuous band (chain) conveyor installed in a manner such that the two conveyor branches pass along the platform parallel to each other and to the conveyor branches of the other drive mechanism and are displaced vertically relative to each other, one being arranged above the other. The legs of one of the groups are mounted on the conveyor chain of one of the drive mechanisms while the legs of the other group are attached to the conveyor chain of the other drive mechanism. Running along the lower conveyor branch of each drive unit is a guide track which serves to support the upper ends of the legs while they are on the lower conveyor branch.

In the process of translation of the transport vehicle, some of the legs in each group are carried by the upper ("idle") branch of the respective conveyor. In this "idle" condition the legs are retracted. These legs move "forward" relative to the platform along with the conveyor chain and "forward" again along with the platform itself which is being translated relative to the travel surface. The other leg in each group are carried at the same time by the lower ("working") branch of the respective conveyor. These legs are in the working position, that is extended so that they contact the travel surface. The "working" legs are stationary relative to this surface while they move "backwards" relative to the platform, resulting in the platform itself moving "forward."

With the platform moving some distance forward, the rear-most "working" leg in each group, on the lower conveyor branch, is retracted, departing from the travel surface, and, as a result of translation along with the chain, passes over to the upper (idle) conveyor branch. At the same time, the foremost "idle" leg in each group, on the upper conveyor branch, passes over to the lower conveyor branch as a result of its movement with the chain. Having done so, the leg is extended and drops down to the travel surface.

As this leg is lowered down on to the travel surface, there is no movement by this leg along this surface, since all the other legs carried by the lower conveyor branch, as well as the corresponding part of the chain connecting them, are stationary relative to the travel surface.

In the process of further translation of the platform, the "idle" legs on each side of the platform pass over one by one on to the lower conveyor branch, to lower down to the surface. At the same time, the "working" legs pass over one by one after another over onto the upper conveyor branch. Thus, continuous translation of the platform is ensured in a rectilinear path parallel to the conveyor branches, without the legs sliding relative to the travel surface. This affords considerably higher translation speed for the transport vehicle.

The method proposed for turning the platform is by moving the conveyor chains at different speeds. However, this leads to the lower leg ends sliding over the travel surface. This results in, as previously mentioned, in leg breakdown, especially when using heavily loaded platforms.

There is known a walking transport vehicle wherein the conveyor branches of each leg drive mechanism are displaced horizontally rather than vertically (Soviet Union Patent No. 310012). In this transport vehicle, mounted to the platform are two closed guides passing over different sections of the bottom surface of the platform and each having two sections connected in series passing rectilinearly in parallel to each other and to the sections of the other guide. The first guide mounts the upper ends of the first group of legs, the second guide correspondingly mounts the upper leg ends of the second group of legs. The transport vehicle also contains a drive mechanism for moving the first group of legs along the first guide and a drive mechanism for moving the second group of legs along the second guide. Each leg drive mechanism comprises a continuous band conveyor with conveying branches passing respectively, along the corresponding guide sections, and means to connect the upper ends of the legs of the corresponding group with the conveyor band.

In the process of translation of this transport vehicle, the legs moving along one of the parallel sections of each guide are in the idle position while the legs moving (relative to the platform, not the travel surface) along the other section of this guide are in the working position. They rest upon the travel surface and remain stationary relative to this surface until they pass, along with the chain, onto the "idle" guide section.

This walking transport vehicle design, just as the transport vehicle construction with the conveyor units, as previously described, will assure a relatively fast and continuous translation of the platform. But these designs will not permit the turning of the platform without the lower ends of the legs sliding over the travel surface, thereby reducing the reliability of movement of the transport vehicle while making a turn.

SUMMARY OF THE INVENTION

The principal object of the present invention is to provide a walking transport vehicle capable of executing continuous translation and having its leg driving mechanism designed so as to permit the transport vehicle to be turned without the legs sliding over the travel surface, thus enhancing the reliability of movement of a walking transport vehicle.

The object, as stated above, is achieved by providing a walking transport vehicle comprising a platform and two closed guides passing over different sections of the bottom side of the platform, each having at least two sections connected in series, one of these sections passes rectilinearly in parallel with the first section of the other guide. A first group of extensible and retractable legs having their upper ends mounted in a shiftable (movable) manner in the first guide and a second group of extensible and retractable legs having their upper ends mounted in a shiftable (movable) manner in a second guide are further provided. The assembly also includes a first conveyor device designed to shift the first group of legs along the first guide and a second conveyor device designed to shift the second group of legs along the second guide. According to the invention, the second sections of the guide are bent in the form of segments or arcs of a circle, each of which is arranged in a plane normal to a straight line passing through the center of curvature of the circle segments.

If said circle segments or arcs lie in the same plane, they have a common center of curvature.

In the process of translation of such a transport vehicle, the legs in each group are in the working condition while they are moving along the first (rectilinear) section of the respective guide. They are in the idle condition when being moved along the second (curved) section. When the platform is making a turn the legs of each group are in the working position while moving along the second section of the respective guide and in the idle condition when moved along the first section thereof. As the platforming is making a turn, the legs remain stationary relative to the travel surface when in the second section of the respective guide and move relative to the platform around the same vertical axis as the legs moving along the second section of the other guide. This arrangement ensures that none of the legs will slide relative to the travel surface in the platform turning process, thereby assuring reliable translation for the transport vehicle. In accordance with the proposed transport vehicle design, the legs are capable of moving along the curved guides both with the platform being translated and with the platform making a turn, so that there is no need for bending the guides. This permits the walking transport vehicle to be capable of moving in any direction. This also permits a relatively simple construction featuring high reliability and high carrying capacity. These advantages are missing where curved guides are used in walking transport vehicles with legs designed to perform reciprocating motion.

Each of the guides may have a third section connected in series with the first and second sections thereof. In this design of the transport vehicle, higher stability may be assured for the vehicle. In this case the first (rectilinear) and second (curved) guide sections are arranged on the four different sides of the platform while the third sections remain idle both with the platform moving rectilinearly and with the platform making a turn and only to serve for the legs moving from the second section to the first section or visa versa. To move the extensible and retractable legs over the third guide section, the same conveyor may be used as it provides for their movement along the first and second sections of this guide. It is possible to use a vehicle in which each conveyor device incorporate a second conveyor and means to connect the continuous band of this conveyor with the upper ends of the legs of the respective group to provide for their movement along the third section of the corresponding guide. The presence of two conveyor units permits reducing the total number of legs, enabling them to move via the third guide sections at a higher speed than via the other two.

Where each conveyor unit uses two conveyors, the means to connect the legs with the continuous band member may take the form of spring-loaded pins mounted on each of the conveyor band members. Each pin of the first conveyor should be mounted so as to be able to have the first of its ends bearing against a support element passing along the first and second sections of the respective guide. The pin must also have the second of its ends interacting and engaging with one of two holes fitted in each leg near its upper end as the first end of the pin bears against the above support element. Each pin of the second conveyor is mounted so as to be able to have the first of its ends bearing against a support element passing along the third section of the respective guide and to have the second of its ends interacting and engaging with the other of the holes when the first end bears against the above support element.

Other advantages and aspects of the present invention will become apparent upon reading the following description of the drawings and detailed description of the invention.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

Figure 1:
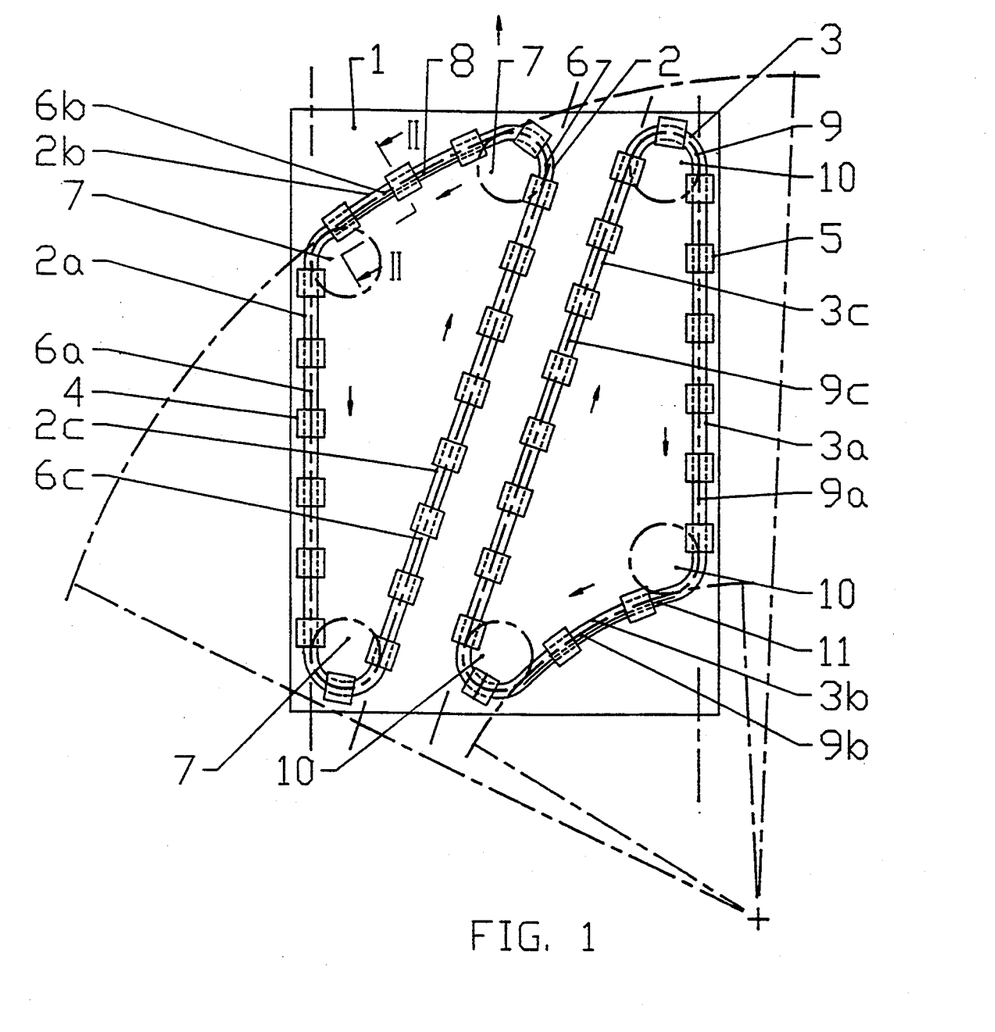
FIG. 1 is a schematic bottom view of the platform of the walking transport vehicle using one conveyor in each leg drive mechanism.

In accordance with FIG. 1, mounted to the bottom of the rectangular platform (1) are two closed guides (2 and 3) passing over different sections of the bottom surface of the platform (1). The first guide (2) has a first section (2a) that passes rectilinearly near one of the side edges of the platform (1). A second, curved section (2b) has one end connected with the fore end of the first section (2a), which is located close to the fore edge of the platform (1). A third, rectilinear section (2c) is connected to the other end of the second section (2b) and the aft end of the first section (2a). The second guide (3) has a first, rectilinear section (3a) which passes close to the other side edge of the platform (1) parallel to the first section (2a) of the first guide (2). A second, curved section (3b) has one end connected to the aft end of the first section (3a), which is located close to the aft edge of the platform (1). A third, rectilinear section (3c) connects the other end of the second section (3b) with the fore end of first section (3a).

The two second sections (2b) and (3b) are curved in the form of segments or arcs of a circle. Each segment is arranged in a plane normal to a straight line passing through its center of curvature. This implies that the segments of the circles, which the two second curved sections (2b,3b) follow, may lie either in the same plane, in which case the centers of curvature of these circle segments coincide, or in different planes parallel to each other, in which case their centers of curvature must lie on one straight line normal to these planes. In accordance with FIG. 1, both of these segments are curved towards the fore edge of the platform (1) so that their centers of curvature lie behind the aft edge of the platform (1); if these segments or arcs are in one plane, they will be part of two concentric circles.

Another embodiment is also possible in which the segment of the fore edge of one of the guides is curved towards the fore section of the platform while the segment of the aft section of the guide is curved toward the aft edge of the platform. In this case, the center of curvature of the segments will be in the central part of the platform. Thus, if the segments are in the same plane, they will be parts of the same circle.

Mounted in a shiftable manner (movably mounted) in guide (2) are the upper ends of a group of extensible and retractable first legs (4). (Also see FIG. 2). The second guide (3) mounts in a similar manner a group of extensible and retractable second legs (5).

The transport vehicle also incorporates a continuous band conveyor device to drive the first legs (4) along the first guide (2). In accordance with the embodiment illustrated in FIG. 1, the continuous band conveyor takes the form of a continuous first chain (6). This first chain (6) is placed on three sprockets (7) mounted at the connection points of the three sections (2a, 2b, 2c) of the first guide (2). One of the sprockets (7) is coupled with a device designed to rotate it (not shown). The first chain (6) passes along the first guide (2) sections forming three conveyor branches (6a, 6b, 6c), passing along the three sections (2a, 2b, 2c), respectively. This chain arrangement is achieved by suitably locating the sprockets, and by means of a third guide (8) which supports the side surface of the part of the first chain (6) as it passes along the second section (2b) of the first guide (2). The third guide (8) is curved as a segment or arc of the circle passing along the second section (2b) of the first guide (2) on the inner side of the first chain (6) loop.

The transport vehicle also utilizes a mechanism to drive the second legs (5) along the second guide (3). This has the same form as the one that was used to drive the first legs (4) along the first guide (2), with the exception of the chain guide design. The drive unit for the second legs (5) incorporates a conveyor device in the form of a continuous band in the form of a second chain (9) placed on three sprockets (10), one of which is run by a drive. The second chain (9) passes along the three sections (3a, 3b, 3c) of the second guide (3) forming three conveyor branches (9a, 9b, 9c). The drive unit for the second legs (5) also includes a fourth guide (11) which supports that part of the second chain (9) that passes along the second section (3b) of the second guide (3). The fourth chain guide (11) is curved as a segment or arc of the circle, passing along the second section (3b) of the second guide (3) on the inner side of the second chain (9) loop.

Figure 2:
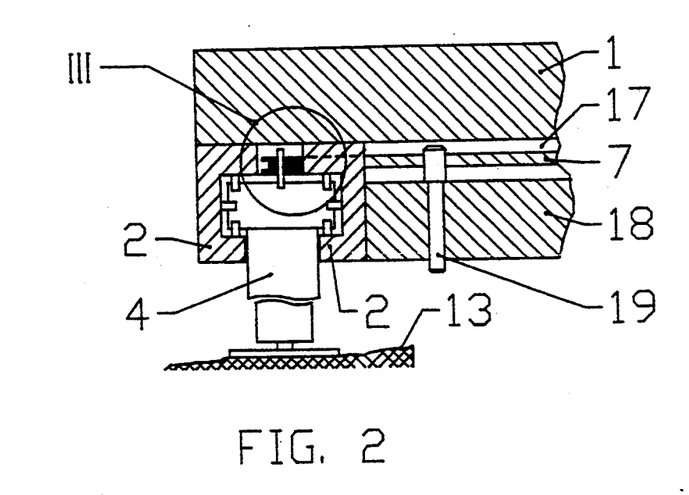
FIG. 2 is a sectional view taken along line II—II of FIG. 1.
Figure 3:
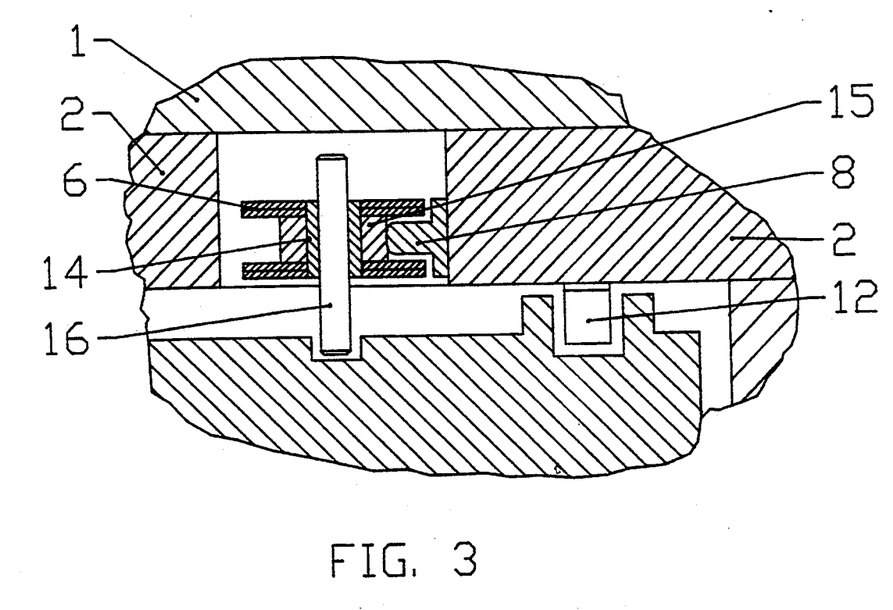
FIG. 3 is an enlarged partial view of the section illustrated in FIG. 2.

According to FIGS. 2 and 3, the first guide (2) consists of two parts, each U-shaped and having one of its flanges attached to the bottom surface of the platform (1). Between the parts of the first guide (2) there is formed a cavity which runs the entire length of the guide and in which mounts the expanded upper ends of the first legs (4). At the upper end of each first leg (4) there are rollers (12) rotatably mounted. The legs bear via the rollers (12) upon the support surfaces formed by the corresponding inner surfaces of the U-shaped parts. The lower end of the first leg (4) bears upon the travel surface (13).

Passing over the upper ends of the first legs (4) is a first chain (6 in FIGS. 2 and 3). FIGS. 2 and 3 also show a chain guide (8) mounted on the upper flange end of one of the U-shaped parts of the guide (2). The links of the first chain (6), each composed of a pair of flat parallel plates, are connected by bushings (14). Each of these bushings (14) has a roller (15) mounted so that it is free to rotate. As the roller (15) travels in the second section (2b) (FIG. 1), on the chain guide (8) (FIGS. 2 and 3), it moves along the inner side of the first chain (6) loop into the gaps between the plates comprising the chain links.

The leg drive unit for the first legs (4) also contains a means to connect the first legs (4) with the first chain (6). This connection means has the form of pins attached to the first chain (6) at regular intervals equal to the required spacing between the first legs (4). The upper end of each pin (16) is secured in the corresponding bushing (14) while its lower end enters a blind hole located in the upper end of the first leg (4).

The sprocket (7) is installed within a recess (17) of a support element (18) which is attached to the bottom surface of the platform (1) and which mounts the axle (19) of the sprocket (7).

In FIG. 1, the mounting of the second legs (5), the second chain (9) and their interconnection are similar to the mounting and interconnection of the first legs (4) and the first chain (6).

With the transport vehicle in the stationary condition the legs (4 and 5 of FIG. 1) are located in the rectilinear sections (2a, 3a) and also in the arcuate second sections (2b, 3b) of the first guide (2) and second guide (3) and the legs are in the extended position resting on the travel surface (13). The platform (1) is supported by the legs passing along its edges. This ensures good stability for the platform. The legs (4, 5) in the third sections (2c, 3c) of the first and second guides (2, 3) may also be put down on the travel surface in this case.

When the necessity arises for rectilinear translation of the transport vehicle in the direction shown by the arrow in FIG. 1, the legs (4, 5) in the second and third sections (2b, 2c, 3b, 3c) are retracted so that the platform (1) bears upon the travel surface through the legs in the first sections (2a, 3a). Having retracted the legs, the sprockets (7, 10) coupled with the drive unit set into rotation. This moves the chains (6, 9) in the direction shown by the arrows an FIG. 1. The rollers (15) in FIGS. 2 and 3 within the sections of chains (6, 9) pass along the first sections (2a, 3a) (FIG. 1) rolling in the guides (8, 11), thus making the chains move over these sections along a curved path.

The pins (16 in FIGS. 2 and 3) move along with the first chain (6) making the first legs (4) move along the first guide (2) with the rollers (12) rolling over the corresponding support surfaces of the first guide (2). Since the first legs (4) in the first section (2a) of the first guide (2) are in contact with the travel surface, their displacement along the first guide (2) causes the platform (1) to be displaced relative to the travel surface in the opposite direction. Concurrently, the retracted first legs (4) in the second and third sections (2b, 2c), are moved along the first guide (2). The first legs (4) move relative to the platform (1) and, simultaneously, together with the platform in the direction the platform (1) is being translated.

In the process of forward translation of the platform (1) the first legs (4) in the first section (2a) of the first guide (2) are displaced from the fore end to the aft end. As the first legs (4) approach the aft end, they are retracted one after another and then pass over to the second section (2b). Simultaneously, as the first legs (4) appear at the fore end of the first section (2a), after passing through the second section (2b), they are extended one by one to make contact with the travel surface. When the leg at the fore end of the first section (2a) is lowered down, there is no sliding between its lower end and the travel surface. This is because all the other legs in this section, as well as the entire section of the first chain (6) which forms the conveyor branch (6a), remain stationary relative to the travel surface.

The displacement of the second legs (5) along the second guide (3) by means of the second chain (9) is effectuated in a similar manner as described above. The second legs (5) will extend one after another as they approach the fore end of the first section (3a) and will retract as they near the aft of this section. Since the first sections (2a, 3a) of first and second guides (2, 3) are rectilinear and parallel to each other, the platform will move forward in a direction parallel to these two guides. Given equal leg displacement over the two guides (2, 3), there will be no leg slippage over the travel surface. This arrangement provides good platform stability during the process of platform translation. The platform (1) is thus supported at all times by two series of legs passing along the opposite sides of the platform.

When the necessity arises for the transport vehicle to make a turn, the chains (6, 9) of the conveyors are brought to a halt. This results in the motion of the transport vehicle being discontinued. Following this phase, the legs (4, 5) in the second sections (2b, 3b) of the two guides (2, 3) are extended to make contact with the travel surface. Concurrently, the legs (4,5) in the first sections (2a, 3a) are retracted to the idle position. Next, the sprockets (7, 10) are set into rotation. The direction of rotation of the sprockets and that of the chain displacement depend upon the direction selected for turning. One of the chains (6 or 9), illustrated in FIG. 1, will in this case move in the direction opposite to that shown by the arrows.

In the process of the platform (1) making a turn, the legs (4, 5) appearing at one of the ends of each of the curved second sections (2b, 3b) of the two guides (2, 3) are extended one by one to make contact with the travel surface while the legs coming over to the opposite end of the section are retracted.

It is easy to see that if each of the circle segments or arcs followed by the curved second sections (2b, 3b) of the two guides (2, 3) is arranged in a plane normal to the straight line passing through their centers of curvature, there will be no leg slippage relative to the travel surface. This holds true only when the displacement speeds of the two chains (6, 9) are selected such that equal angular speeds are assured for their displacement via the sections forming the second conveyor branches (6b, 9b), around the centers of curvature of the respective circle segments. The case illustrated in FIG. 2 implies that in the turn-making process the first chain (6) must move at a higher speed than the second chain (9). The turn radius of the platform (1) will be relatively large because it will turn about an axis behind the aft edge of the platform. In the case where the sections are curved in opposite directions, the chain displacement speeds for both conveyors must be equal. The platform (1) will turn "on the spot" because the center of rotation will be in the central part of the platform.

To ensure stability for the transport vehicle in the turn making process, the length of the fore and aft edges of the platform must be sufficiently large, i.e., the platform must have a form close to square or somewhat elongated across the direction of travel.

Figure 4:
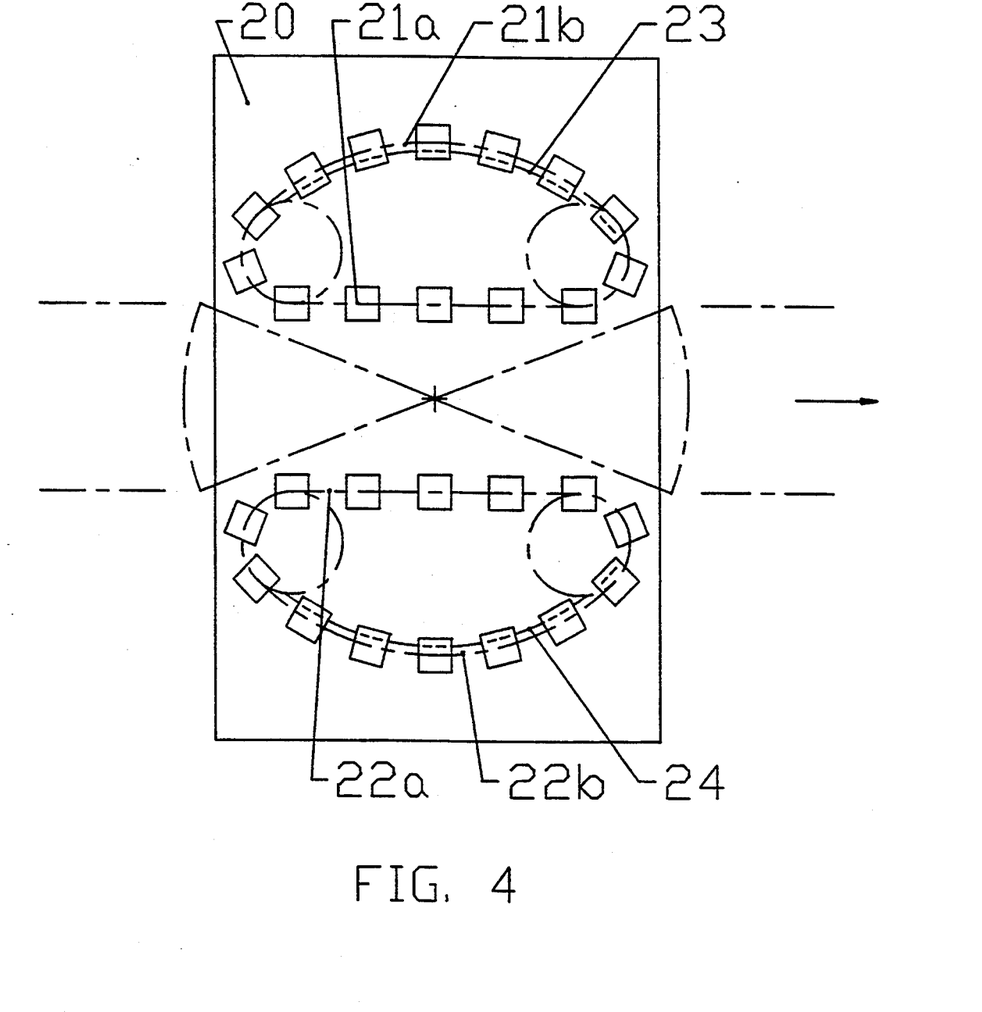
FIGS. 4 and 5 are schematic illustrations of other possible versions of arranging the conveyors on the platform using one conveyor in each leg drive mechanism.
Figure 5:
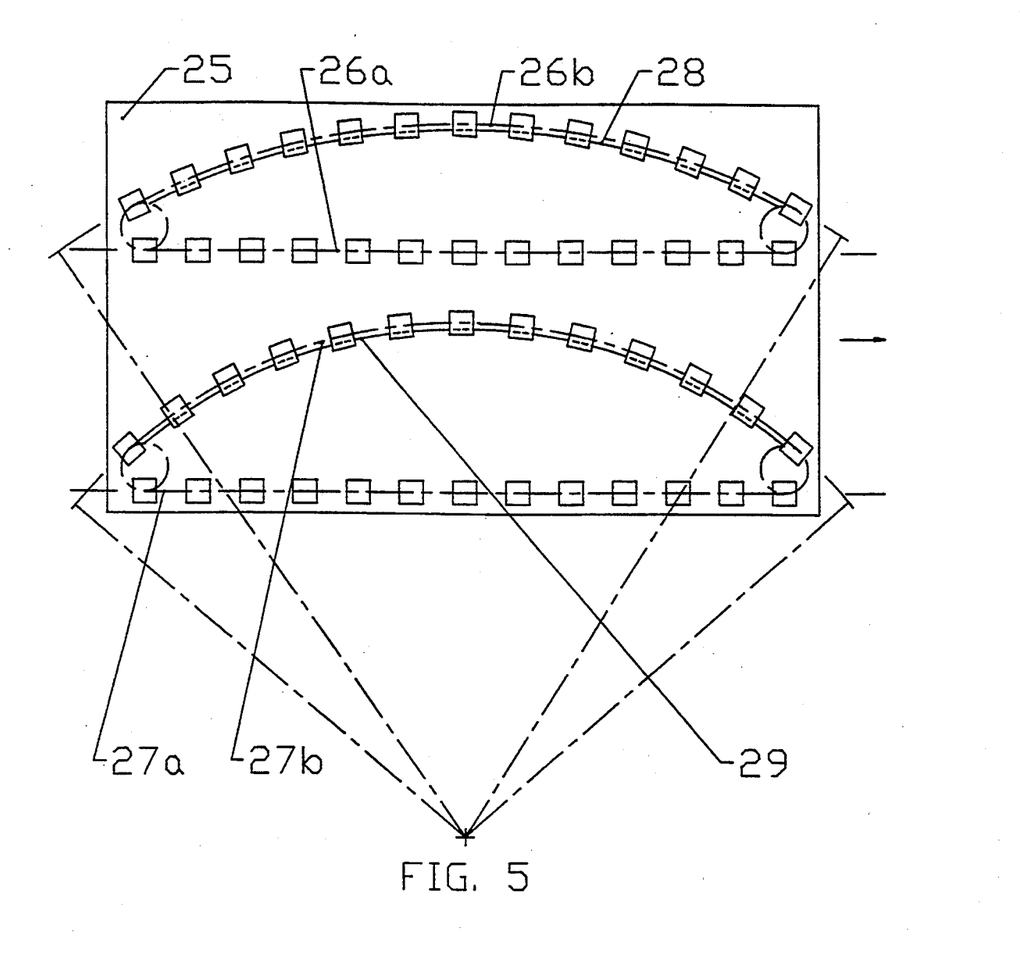

FIGS. 4 and 5 illustrate schematically other possible versions of the guide conveyor arrangement on a platform using one conveyor for each leg drive unit. The leg guides are omitted from FIGS. 4 and 5 since their direction coincide with those of the respective conveyor branches.

According to FIG. 4, one of the guides installed on the platform (20) has a rectilinear section passing along the conveyor first branch (21a) of one of the conveyors and a curved section that has its ends connected respectively to the ends of the rectilinear section and passing along the conveyor second branch (21b) of this conveyor. The other guide has a rectilinear section passing parallel to the rectilinear section of the first guide along the conveyor first branch (22a) of the second conveyor and a curved section having its ends connected respectively to the ends of the rectilinear section of the same guide and passing along the conveyor second branch (22b) of the second conveyor. The curved guide sections passing along the conveyor second branches (21b, 22b) are curved so that their centers of curvature lie within the central part of the platform (20), close to its side edges.

To provide for the displacement of the conveyor chains along the curved sections, there is a curved chain guide installed on the inner side of the chain loop of each of the conveyors. One such guide (23) provides for the bending of the conveyor second branch (21b) of the first conveyor, and the other guide (24) provides for the bending of the conveyor second branch (22b) of the second conveyor.

In the process of rectilinear translation, the platform (20) is supported by the legs positioned along the conveyor first branches (21a, 22a). During the turn-making process, the supporting legs are those positioned along the conveyor second branches (21b, 22b).

In the case of the guides and conveyor chains being arranged as shown in FIG. 4, the rectilinear sections of the guides, that pass along conveyor first branches (21a, 22a) are found to be displaced towards the central part of the platform (20). To ensure good stability of the platform, this method of guide and conveyor arrangement should therefore be employed when the platform is of a form elongated across the direction of travel. Owing to the fact that there is no third "idle" section in the guide, such as is used to connect the rectilinear and curved "working" sections, this method of arrangement is the simplest and permits for a fewer number of legs.

According to FIG. 5, the guide and conveyor arrangement likewise allows for two end-connected sections to be used for each closed guide. However, in this case the centers of curvature of the curved sections are beyond the boarders of the platform (25). The rectilinear sections of the different guides pass in parallel along the conveyor first branches (26a, 27a) of the different conveyors, while the curved sections of these guides run along the second conveyor branches (26b, 27b) of these conveyors, respectively. To assure the bending of the conveyor second branches (26b, 27b), two chain guides (28, 29) are used, respectively.

From the standpoint of stability, the scheme illustrated in FIG. 5 can be used for platforms elongated in the direction of travel and having a fairly large width. This scheme, just as shown in FIG. 4, is simple and permits reduction in the number of legs required.

To reduce the number of legs in the case of using guides with a third "idle" section connecting the rectilinear and curved "working" section (as in FIG. 1), conveyor units can be used. Each conveyor unit is comprised of two conveyors moving at different speeds, as shown in FIGS. 6 and 7.

Figure 6:
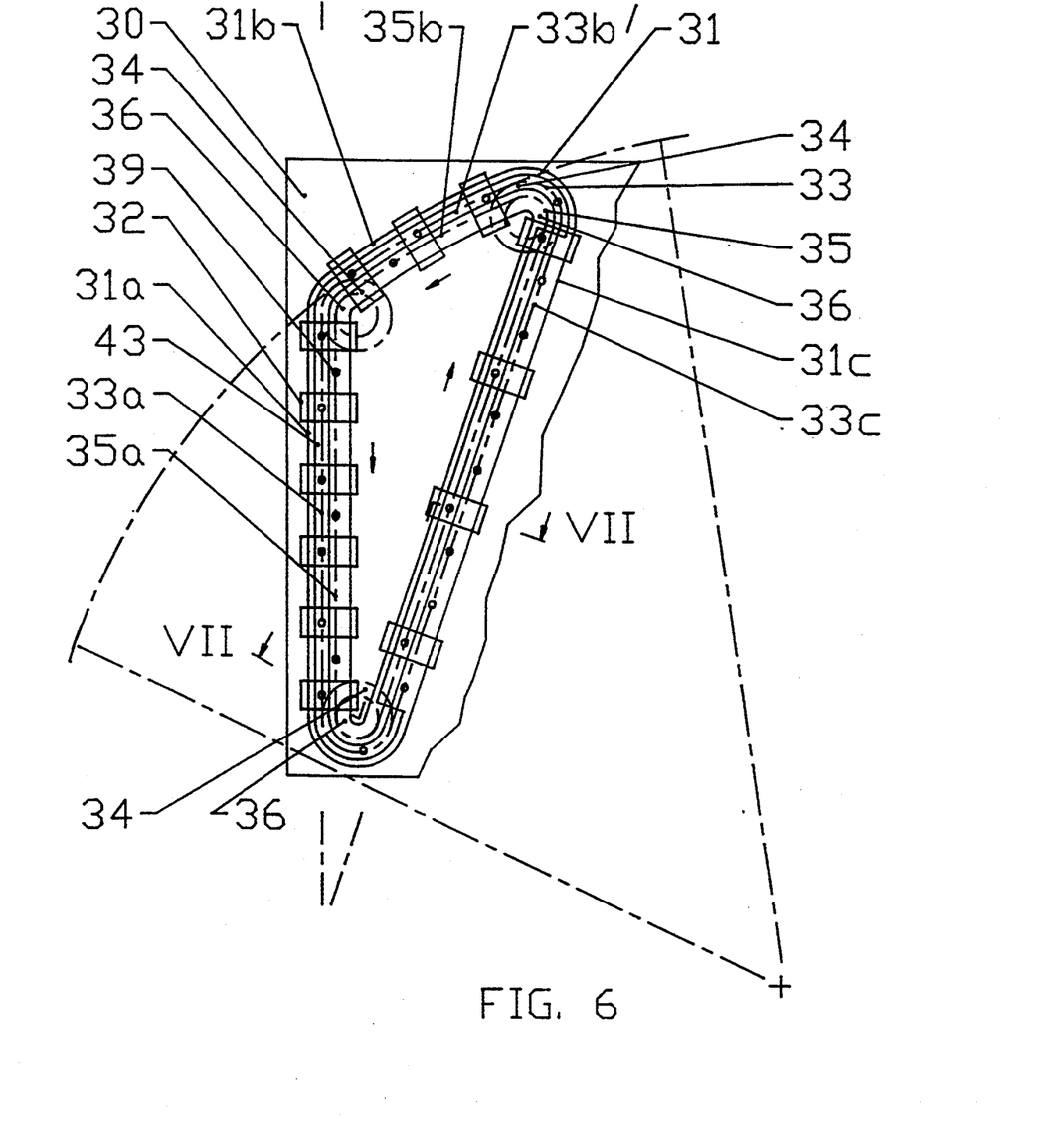
FIG. 6 is a schematic partial bottom view of the platform of the walking transport vehicle using two conveyors in each leg drive mechanism; and, FIG. 7 is a sectional view taken along line VII—VII of FIG. 6.

FIG. 6 is a schematic partial bottom view of a platform with one of two closed guides mounted to it. According to FIG. 6, mounted to a platform (30) is a first guide (31) with a rectilinear, first section (31a), a curved, second section (31b) and a rectilinear, third section (31c) arranged similar to the corresponding sections (2a, 2b, 2c) of the first guide (2) in FIG. 1. Mounted to the first guide (31) are the upper ends of extensible and retractable first legs (32). Shown in FIG. 6, by thin lines, are the outlines of the upper leg ends.

The drive unit (32) is designed to move the legs along the first guide (31) and is comprised of two continuous-band conveyors. The continuous band of one of the conveyors has the form of a continuous first chain (33) placed over first sprockets (34). The other conveyor's band is a second chain (35) placed on separate, second sprockets (36). The first chain (33) passes along the sections of the first guide (31), forming the conveyor three first branches (33a, 33b, 33c) of the first conveyor. The second chain (35) passes respectively along the three sections (31a, 31b, 31c). The second chain (35) likewise passes along the sections of the first guide (31), forming the conveyor second branches (35a, 35b, and 35) of the second conveyor, passing respectively along the three sections (31a, 31b, 31c). Passing along the curved second section (31b) are the two curved chain guides (33, 35), which are omitted from FIG. 6.

Figure 7:
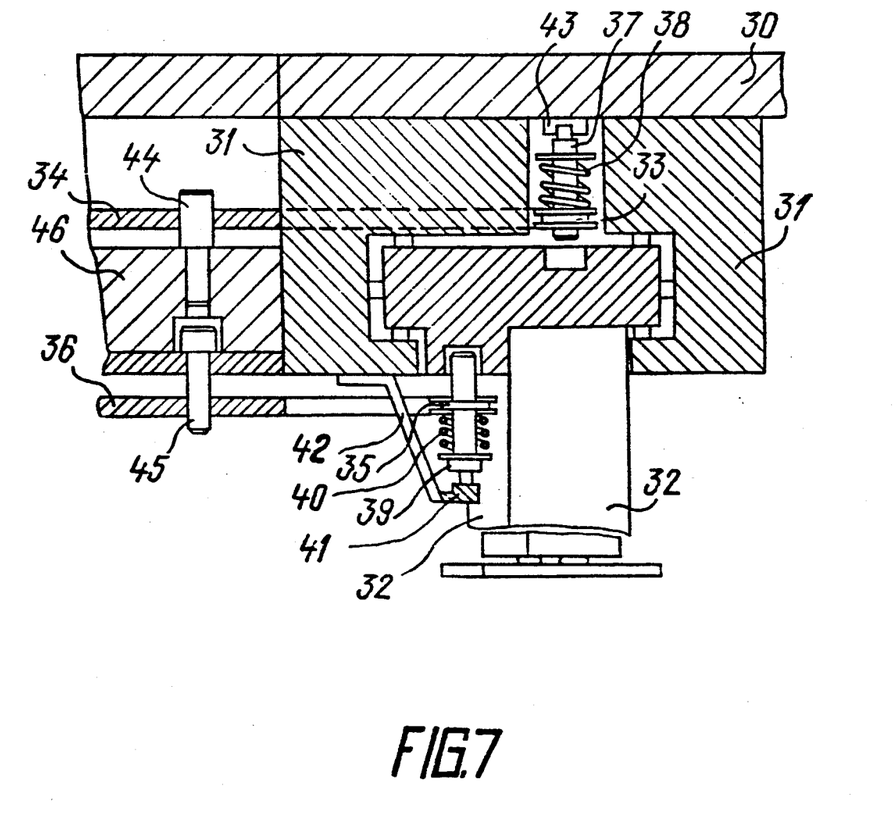

According to FIG. 7, the first guide (31) is made of two U-shaped parts mounted similarly to the U-shaped parts of the first guide (2) in FIG. 2. However, in this case the two parts are farther apart. Mounted in the cavity between the two parts of the first guide (31) is the upper end of first leg (32). The upper end of the first leg (32) bears upon the inner surfaces of the first guide (31) through the use of rollers, which are mounted in a similar manner as the rollers (15) in FIG. 2.

The first chain 33 in FIG. 7 is installed above the upper ends of the first legs (32), similar to the first chain (6) in FIG. 2. The leg drive unit for the first legs (32) also contains a means to connect the first legs (32) to the chains (33, 35). The means for connecting the first legs (32) with the first chain (33) take the form of first pins (37 of FIGS. 6 and 7) mounted to the chain at regular intervals equal to the spacing between the first legs (32) in the first and second sections (31a, 31b) of the first guide (31).

Each first pin (37) is movably mounted within a hole of the corresponding bushing, which connects the adjacent links of the first chain (33). This first pin (37) protrudes or projects beyond the bushing on both sides, i.e. on the top and at the bottom. The upper protruding portion of the first pin (37) has a radial circular shoulder which supports a cylindrical spring (38) embracing the upper protruding portion of the first pin (37). The first pin (37) sits in the interior portion of the spring (38). This spring is installed between the radial shoulder of the pin and the upper plate of the corresponding link of the first chain (33). The lower protruding portion of the first pin (37) is likewise provided with a radial circular shoulder, which restricts its upward motion under the action of the spring (38). On the top end of the first leg (32) there is a blind hole which can accept or take in the lower end of the first pin (37) when it is in the down position.

The upper end of the first leg (32) protrudes beyond the rest of the leg, a considerable part of the lower surface of the protruding portion of the leg end being in the gap between the rest of the leg and the edge of the lower flange of the U-shaped part of the first guide (31). The second chain (35) is installed on the lower side of the first guide (31) and arranged under the lower surfaces of the protruding portions of the first legs (32). The second chain (35) is organized and made similar to the first chain (33).

The means of connecting the first legs (32) with the second chain (35) take the form of second pins (39). These second pins (39) are mounted on the chain at equal intervals, which are considerably larger than those of between the other, first pins (37 in FIG. 6). The second pins (39 in FIG. 7) are made similar to the other, first pins (37) and are mounted in a movable manner in the holes of the corresponding bushings of the second chain (35). Mounted on the portion of the second pin (39) that protrudes downwards past the corresponding bushing, there is a cylindrical second spring (40). This second spring (40) surrounds the second pin (39) and is supported by the lower radial shoulder of the pin.

On the lower surface of the protruding part of the upper end of the first leg (32), there is a blind hole which can accept the upper end of the second pin (39) when it is in the raised position, as seen in FIG. 7. Under the lower end of the second pins (39) there is a support element in the form of a second guide (41) passing along the second section (31b) from one end to the other, as seen in FIG. 6. The second guide (41) is mounted on brackets (42 on FIG. 7) that are attached from below to the U-shaped part of the first guide (31).

Installed on the bottom side of the platform (30) and above the upper ends of the first pins (37) is a support element in the form of a third guide (43 in FIG. 6). This guide passes along the first and second sections (31a, 31b) from one end of the third section (31c) to the other.

Sprockets 34 and 36 are mounted on axles (44, 45) respectively. The axles are mounted on the upper and lower support element (46), which is attached to the bottom surface of the platform (30).

In the process of translation of the platform (30), the second chain (35) (FIGS. 6 and 7) moves at a considerably higher speed than the first chain (33). In the first and second sections (31a, 31b) of the first guide (31), as well in the sections rounding the sprockets (36), the upper ends of the first pins (37) on the first chain (33) butt against the third guide (43) so that when the first pins (37) are in the down position they can enter the hole in the upper end of the corresponding first leg (32). In this same section, the second pins (39) are in the down position and are being acted upon by the second spring (40) so that their upper ends cannot interact with the lower holes in the upper end of the first leg (32). In contrast, the lower ends of the second pins (39) on the second section (31b) of the first guide (31) butt against the second guide (41) so that they are in the upward position with their upper end entering the lower hole of the upper end of the corresponding first leg (32). Meanwhile, the first pin (37) is in the upward position under the action of the spring (38). This is due to the fact that there is no second section (31b) in the third guide (43), so their lower end cannot interact with the upper hole in the upper end of the first leg (32).

The first chain (33) displaces the first legs (32) relatively slowly along the first and second sections (31a, 31b) of the first guide (31) while the first legs (32) move considerably faster along the third section (31c) by means of the second chain (35). The maximum speed of displacement of the first legs (32) along the first and second sections (31a, 31b) is limited due to the necessity for the first legs (32) to be seated properly upon the travel surface during the process of translation of the platform (30). The higher speed of displacement of the first legs (32) along the third section (31c) does not affect the platform translation since the legs in this section are in the retracted condition. This higher leg displacement speed in the third section (31c) of the first guide (31) allows for reducing the number of legs in this section at any point in time and thus the total number of legs needed.

Disconnection of a leg from the chain of one conveyor and the connection of this leg to the chain of the other conveyor is effected as follows. When in motion with the first chain (33) from the first section (31a) of the first guide (31) to the third section (31c), the first leg (32) reaches a position wherein the upper end of the first pin (37), which is responsible for moving this leg, passes beyond the edge of guide (43). When this occurs, the spring (38) acts upon this pin to make it rise and leave the upper hole in the upper end of the legs. This causes the leg to stop. Then the second pin (39) of chain (35) appears under the lower surface of the lower end of this leg. The lower end of this pin butts against the second guide (41) causing the pin to rise up and enter the lower hole in the upper end of the leg. This ensures a proper connection with the second chain (35).

Similarly, when in moving with the second chain (35) along the third section (31c) of the first guide (31), the leg reaches the position, wherein the lower end of the second pin (39) responsible for moving this leg passes beyond the edge of the end of the second guide (41), the second spring (40) acts upon this pin to make it come down and leave the lower hole in the leg. Then, above the upper end of this leg, there appears the first pin (37) of the first chain (33), the upper end of the pin butting against the third guide (43) to make this pin enter the upper hole of the upper end of the leg, ensuring their connection with the first chain (33).

The transfer of the leg from the pin of one conveyor chain to the pin of the other conveyor chain when the first legs (32) are displaced along the guide in the reverse direction is effectuated in a similar manner.

To ensure that the pins go into the leg hole, the size of the hole in the direction of pin movement must exceed the size in the same direction of the pin end entering the hole. To achieve this objective, the ends of each guide may be chamfered on the side facing the pins or may be bent away to the side opposite to the pins. This will provide for a gradual change in the position of the pin after it makes contact with the guide end. To reduce the friction between the second and third guides (41, 43) with the pins (39, 37), rollers are provided on the upper end of first pin (37) and the lower end of the second pin (39).

The ends of the second and third guides (41, 43) are not necessarily located at the end of the third section (31c) (as in FIG. 6). The only thing that matters is that the second guide (41) should pass along the third section (31c) and the third guide (43). The third guide (43) should also pass along the first and second sections (31a, 31b) and adjacent ends of the different guides should not have a gap to separate them. Thus, pairs of adjacent guide ends may be at the ends of the first and second sections (31a, 31b) of the first guide (31). However, the embodiment illustrated in FIG. 6 is preferable in view of the high centrifugal forces that may occur when the legs pass, at a high speed, around the two sprockets (34, 36).

The means to connect the first legs (32) with the first and second chains (33, 35) can take a different form provided that the first legs (32) are connected with the first chain (33) when in the "working" sections (31a, 31b) of guide (31) and with the second chain (35) when in the "idle" section (31c). Such a means of connection may contain pairs of spring-loaded pins installed in two holes on the upper end of the transport vehicle legs, a plurality of protruding elements attached to each chain and two retaining elements. The protruding elements attached to one of the chains are installed so that they can interact with the pins installed in other holes in the legs as the pins rise above these, while the protruding elements attached to the other chain are installed so as to be capable of engaging with the pins installed in the other holes in the legs when the pins rise above these holes. One of the retaining elements prevents the pins from exiting or from rising above some holes in the legs that are in the "working" sections of the guide. The other retaining element prevents the pins from exiting from or rising above the other holes in the "idle" section of the guide.

Since the fast moving conveyor first and second branches (35a, 35b of FIG. 6) are not used for leg displacement, the chain of this conveyor may be installed on two second sprockets (36). In this case, the conveyor will have two parallel branches, one of which must pass along the third section (31c) of the first guide (31).

The conveyor means of the leg drive unit used to displace the legs along the second guide of the platform can be comprised of two conveyors. In this case, it is made and operates similar to the conveyor means of the leg drive unit used to displace legs along the first guide.

Thus, the present invention permits both continuous translation of the walking transport vehicle and for its turning without the legs of the transport vehicle slipping relative to the travel surface. The invention affords high translation reliability, faster translation speed and higher cost-efficiency for walking transport vehicles. This design is especially useful for massive, heavily loaded vehicles.

The invention can be most advantageously used for transporting large-sized heavy cargo in inaccessible areas, e.g., tundras, icy or hilly regions. Pipes, tree trunks, railway sections, bridge sections, drilling rigs, self-propelled vehicles, cranes and highway construction equipment are examples of possible cargo for such a vehicle.

While the specific embodiments have been illustrated and described, numerous modifications come to mind without significantly departing from the spirit of the invention and the scope of protection is only limited by the scope of the accompanying claims.

We claim:

1. A track assembly for use on a walking transport vehicle having a platform with a top surface and a bottom surface and retractable legs within the track assembly comprising:

a platform having a top surface and a bottom surface;

a first and a second closed guide adapted for receiving the legs mounted substantially parallel to the bottom surface of the platform and having each a first section and a second section connected in series, said first section of each said guide passing rectilinearly and in parallel with said first section of said other of said guides, said second sections of said guides being substantially circular segments, each said circular segment lying in one plane normal to straight lines passing through centers of curvature of said circular segments, each said circular segment having a common center of curvature; and, a conveyor means for moving the legs along each of said guides.

* * * * *